3,093,637
Patented June 11, 1963

3,093,637
ACETALS AND KETALS OF 9-FLUORO-12-OXYGENATED-16,17,21-TRIHYDROXY STEROIDS OF THE PREGNANE SERIES AND INTERMEDIATES THEREFOR
Patrick A. Diassi, Westfield, N.J., assignor to Olin Mathieson Chemical Corporation, New York, N.Y., a corporation of Virginia
No Drawing. Filed June 13, 1962, Ser. No. 202,087
13 Claims. (Cl. 260—239.55)

This invention relates to the synthesis of new steroids and, more particularly, has for its objects the provision of: (I) advantageous processes for preparing 9α-fluoro-12,16α,17α,21-oxygenated progesterones and 1-dehydroprogesterones; and (II) certain steroids useful themselves as physiologically active steroids or in the preparation of physiologically active steroid derivatives.

The processes of this invention can be summarized by the following equations:

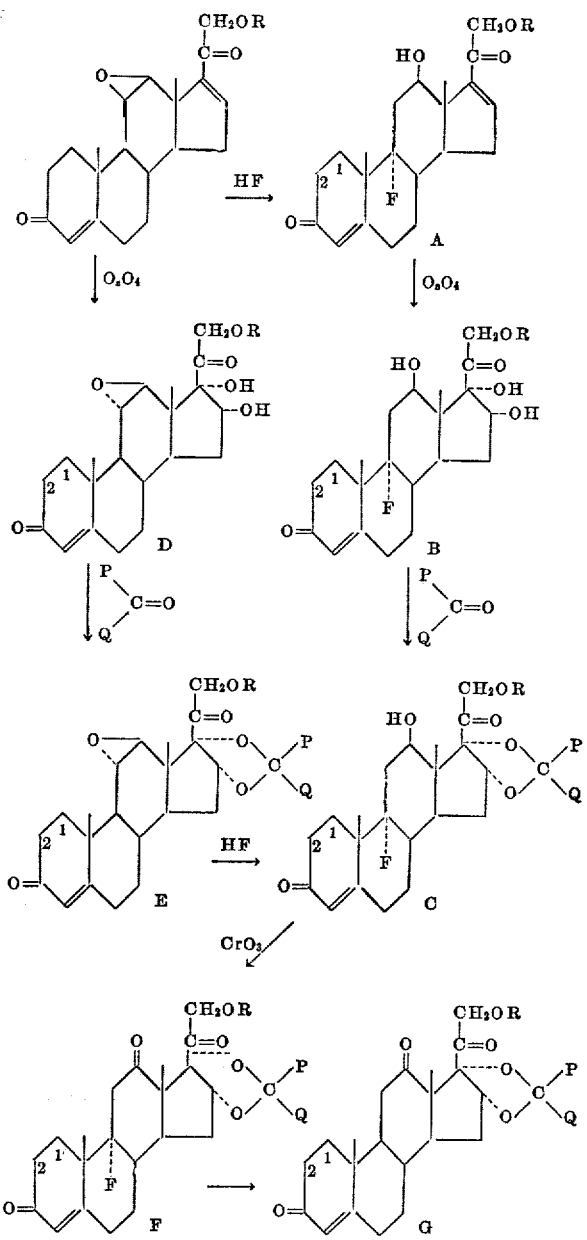

wherein the 1,2-position is saturated or double-bonded;

R is hydrogen or an acyl radical [preferably the acyl radical of a hydrocarbon carboxylic acid of less than ten carbon atoms as exemplified by the lower alkanoic acids (e.g., acetic, propionic, butyric and enanthic acid), the monocyclic hydrocarbon aromatic carboxylic acids (e.g., benzoic acid), the monocyclic hydrocarbon aralkanoic acids (e.g., phenacetic and β-phenylpropionic acid), the lower alkenoic acids, the cycloalkanecarboxylic acids and the cycloalkenecarboxylic acids], P is hydrogen, lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl; Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl; or together with the carbon to which they are joined P and Q is cycloalkyl or monocyclic heterocyclic. Particularly preferred are those compounds wherein R is lower alkanoyl; P is hydrogen or lower alkyl; and Q is lower alkyl or monocyclic aryl.

To prepare the compounds of this invention in accordance with one process of this invention, 11β,12β-epoxy-Δ$^{4,16}$-pregnadiene-21-ol-3,20-dione (or a 21-ester thereof, preferably a 21-ester with a hydrocarbon carboxylic acid of less than ten carbon atoms, such as one of the esters enumerated hereinbefore) is treated with hydrogen fluoride whereby a mixture of 12α-fluoro-Δ$^{4,16}$-pregnadiene-11β,21-diol-3,20-dione and 9α-fluoro-Δ$^{4,16}$-pregnadiene-12α,21-diol-3,20-dione (or the corresponding 21-esters thereof) is obtained. This mixture is then separated chromatographically to yield the new intermediates of this invention, namely, 9α-fluoro-Δ$^{4,16}$-pregnadiene-12β,21-diol-3,20-dione (and 21-esters thereof), Compounds A. The reaction is preferably conducted in an organic solvent for the steroid reactant in the cold (e.g., at a temperature of 0° C. or below).

If desired, the 9α-fluoro-Δ$^{4,16}$-pregnadiene-12β,21-diol-3,20-dione (or 21-ester thereof) can then be treated with 2,3-dichloro-5,6-dicyanohydroquinone to yield the corresponding 9α-fluoro-Δ$^{1,4,16}$-pregnatriene-12β,21-diol-3,20-dione (or 21-ester thereof). The reaction is preferably conducted by dissolving the steroid in an organic solvent and carrying out the reaction at the reflux temperature of the solvent.

Compounds A are then treated with osmium tetroxide, preferably in the presence of an organic base, such as pyridine, to yield the osmate ester of corresponding 16α-17α-dihydroxy derivative, which is then hydrolyzed, as by treatment with sodium sulfite or hydrogen sulfite, to yield the free 16α,17α-dihydroxy intermediates of this invention (Compounds B).

Compounds B are then treated with an aldehyde or ketone of the general formula:

wherein P and Q are as hereinbefore defined to yield certain final products of this invention (Compounds C). The reaction is preferably carried out by treating a suspension or solution of the steroid in the aldehyde or ketone (or an organic solvent if the aldehyde or ketone is a solid) with an acid catalyst (e.g., perchloric acid, p-toluene sulfonic acid and hydrochloric acid), neutralizing the acid and recovering the cyclic acetal or ketal derivative.

Among the suitable aldehyde and ketone reactants are included all aldehydes of at least two carbon atoms and all ketones. These include lower alkanals of at least two carbon atoms, such as paraldehyde, propanal, and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; mono and dicycloalkyl ketones, such as cyclohexylmethylketone and dicyclopropylketone, halo-lower alkanals, such as chloral hydrate, trifluoroacetaldehyde hemiacetal, and heptafluorobutanol ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic) substituted lower alkanols, such as acetophenone, α,α,α-trifluoroacetophenone, propiophenone, butyrophenone, valerophenone, isocaprophenone, halophenyl lower alkyl ketones (e.g. p-chloroacetophenone and p-chloropropiophenone), (lower alkoxy)phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl) phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic heterocyclic)-substituted lower alkanals, such as 2-acetylfuran, 2-benzoyl-furan, and 2-acetylthiophene; oxo substituted monocyclic heterocyclics, such as alloxan; monocyclic heterocyclic lower alkanones; and oxo lower alkanoic acids such as glyoxylic pyruvic, acetoacetic, β-ketopropionic, α-ketobutyric, levulinic, β-ketocaproic and β-ketocaprylic acid [as well as salts and esters thereof, such as the lower alkyl esters (e.g. methyl and ethyl)].

Alternatively, Compounds C can be prepared by reacting the starting steroids, namely, the 11β,12β-epoxy-Δ$^{4,16}$-pregnadiene-21-ol-3,20-dione and its 21-esters, with osmium tetroxide under the conditions detailed hereinbefore to yield the new 11β,12β-epoxy-Δ$^{4}$-pregnene-16α,17α,21-triol-3,20-dione and its 21-esters of this invention (Compounds D), which can, if desired, be 1-dehydrogenated with chloranil as described hereinbefore, to yield the corresponding Δ$^{1,4}$-pregnadiene derivatives.

Compounds D are then treated with an aldehyde or ketone of the general formula:

preferably one of the aldehydes or ketones listed hereinbefore, to yield the corresponding 16,17-cyclic acetal or ketal derivative (Compounds E), which in turn are then treated with hydrogen fluoride to yield Compounds C.

If desired, Compounds C can then be oxidized, as by treatment with chromic oxide to yield the corresponding 12-keto derivatives (Compounds F). Moreover, if Compounds C and/or F are initially obtained in the form of their free 21-hydroxyl form, they can be converted to ester derivatives by treatment with the acyl chloride or acid anhydride of the desired acid, preferably one of the acids listed hereinbefore, the reaction preferably being conducted in the presence of an organic base, such as pyridine.

The final products of this invention can be represented by the general formula

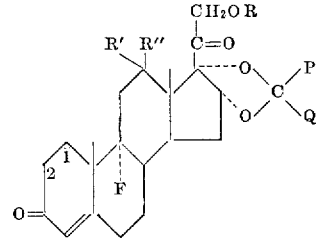

wherein the 1,2-position is saturated or double-bonded, R' is hydrogen, R'' is β-hydroxy, or together R' and R'' is keto, and R, P and Q are as hereinbefore defined.

The final products of this invention are physiologically active substances which possess glucocorticoid activity and hence can be used in lieu of known glucocorticoids, such as hydrocortisone, in the treatment of rheumatoid arthritis, for example.

In addition to their physiological use, Compounds F are also useful as intermediates in the preparation of corresponding 9(11)-dehydro derivatives (Compounds G) to which they are converted by treatment with a strong base, such as sodium hydroxide. These 9(11)-dehydro derivatives are physiologically active substances which possess glucocorticoid activity and hence can be used in lieu of known glucocorticoids, such as hydrocortisone in the treatment of rheumatoid arthritis, for example.

The following examples illustrate the invention, all temperatures being in centigrade:

EXAMPLE 1

9α-Fluoro-Δ$^{4,16}$-Pregnadiene-12β,21-Diol-3,20-Dione 21-Acetate (a) Preparation of 11β,12β-oxidodesoxycorticosterone.—Surface growth from each of 2 three-week old agar slant cultures of Wojnowicia graminis NRRL 2472, the slant containing as a nutrient medium (A): glucose, 10 g.; Difco yeast extract, 2.5; K₂HPO₄, 1 g.; agar, 20 g.; and distilled water to 1 l., are suspended in 2.5 ml. of an 0.01% sodium lauryl sulfate aqueous solution. One milliliter portions of the suspension are used to inoculate four 250 ml. conical flasks, each containing 50 ml. of the following sterilized nutrient medium (B): dextrose, 10 g.; cornsteep liquor, 6 g.; NH₄H₂PO₄, 3 g.; Difco yeast extract, 2.5 g.; CaCl₃, 2.5; and distilled water to 1 l. After 4 days of incubation at 25° C. with continuous rotary agitation (280 cycles per minute, 2 inch radius), 10% (vol./vol.) transfers are made to twenty 250 ml. conical flasks each containing 50 ml. of fresh sterilized medium B. After an additional incubation period of three days, 10% transfers from these flasks are made to two hundred 250 ml. conical flasks each containing 50 ml. of fresh sterilized medium B. 11β,12β-oxido progesterone is added by adding to each flask 0.25 ml. of a sterile solution of the steroid in N,N-dimethylformamide (60 mg./ml.) so that the medium is supplemented with 300 μg./ml. of steroid. After 48 hours of further incubation, the contents of the flasks are pooled and filtered through a Seitz clarifying pad. The flasks, mycelium and pad are washed with successive 50 ml. portions of warm water. The combined filtrate and washings have a volume of eleven liters. This is extracted with three 3.3 l. portions of chloroform which are combined, washed twice with 5 l. portions of water and evaporated to dryness in vacuo. The residue (2.3 g.) on crystallization from acetone-hexane gives 1.0 g. of 11β,12β-oxidodesoxycorticosterone.

(b) *Preparation of 11β,12β-oxido-Δ⁴-pregnene-16α,21-diol-3,20-dione.*—*Streptomyces roseochromogenes* (Waksman No. 3689, The Institute of Microbiology, Rutgers University, New Brunswick, New Jersey) culture is maintained on Gould agar (agar, 20 g.; glucose, 10 g.; yeast extract, 2.5 g.; $K_2HPO_4$, 1 g.; distilled water to 1 liter). Inoculum for the first flask stage is prepared by suspending the surface growth from a two-week old agar slant culture with 5 ml. of an 0.01% Dupanol solution. One milliliter portions of inoculum are used to inoculate ten 250 ml. Erlenmeyer flasks, each containing 50 ml. of the following medium (A):

| | Grams |
|---|---|
| Soybean meal | 20 |
| Glucose | 30 |
| Soybean oil | 2.2 |
| Calcium carbonate | 2.5 |
| Distilled water to 1 liter. | |

The flasks are then incubated at 25° on a rotary shaker 280 cycles/minute, 2 inch radius) for 72 hours. After 72 hours, a 10% transfer (by volume) is made to each of 47 250 ml. Erlenmeyer flasks, each containing 50 ml. of the same medium A. At the time of inoculation of these flasks, 25 mg. of steroid is added to each flask using 0.25 ml. per flask of a 100 mg./ml. solution of 11β,12β-oxidodesoxycorticosterone in N,N-dimethylformamide. A total of 1.09 g. of steroid is thereby fermented. After inoculation and supplementation the flasks are then incubated under the same conditions as described above. At approximately 70 hours after steroid addition, the culture broths are harvested. The contents from each flask are pooled and the pooled broth is then adjusted to pH 4.5 using 12 N $H_2SO_4$. The acidified broth is then filtered through a Buchner-Seitz clarifying pad apparatus. The filtrate (3000 ml.) is collected and extracted three times with one liter portions of chloroform. The combined chloroform extracts are washed twice with 1.5 l. of water and then evaporated to dryness in vacuo. Crystallization of the residue from acetone-hexane give about 300 mg. of 11β,12β-oxido-Δ⁴-pregnene-16α,21-diol-3,20-dione.

(c) *Preparation of 11β,12β-oxido-21-chloro-Δ⁴,¹⁶-pregnadiene-3,20-dione.*—To a cold solution of 240 mg. of 11β,12β-oxido-Δ⁴-pregnene-16α,21-diol-3,20-dione in 15 ml. of dry pyridine, 0.6 ml. of methanesulfonyl chloride is added dropwise. The reaction mixture is stoppered and kept at 5° for 2 hours following which crushed ice is added to decompose the excess methanesulfonyl chloride. The mixture is then distributed between chloroform and water. The chloroform is separated, washed successively with 2 N HCl, 5% $NaHCO_3$ and water and evaporated to dryness in vacuo. The residue is chromatographed on 6 g. of Florisil. Elution with benzene, evaporation of the solvent in vacuo and crystallization from acetone-hexane gives 100 mg. of 11β,12β-oxido-21-chloro-Δ⁴,¹⁶-pregnadiene-3,20-dione.

(d) *Preparation of 11β,12β-oxido-Δ⁴,¹⁶-pregnadiene-21-ol-3,20-dione 21-acetate.*—To a solution of 699 mg. of 11β,12β-oxido-21-chloro-Δ⁴,¹⁶-pregnadiene-3,20-dione in 150 ml. of acetone containing 0.075 ml. of acetic acid, 640 mg. each of potassium iodide and freshly fused potassium acetate are added. The mixture is protected from moisture and refluxed on a steam bath for 16 hours. After cooling the mixture is filtered and washed well with acetone. The filtrate is diluted with 150 ml. of water and on concentration of the solution in vacuo crystals separate which are filtered, washed with water and dried to give 638 mg. of 11β,12β-oxido-Δ⁴,¹⁶-pregnadiene-21-ol-3,20-dione 21-acetate.

(e) *Preparation of 9α-fluoro-Δ⁴,¹⁶-pregnadiene-12β,21-diol-3,20-dione 21-acetate.*—To a stirred solution of 64.4 mg. of 11β,12β-oxido-Δ⁴,¹⁶-pregnadiene-21-ol-3,20-dione 21-acetate in 5 ml. of chloroform and 1.2 mg. of tetrahydrofuran contained in a polyethylene bottle and cooled by means of an acetone-Dry Ice bath, 1.0 ml. of hydrogen fluoride is pipetted by means of a polyethylene pipette. The reaction vessel is stoppered and left at −5° C. for 5 hours and then poured into a polyethylene beaker containing 50 ml. each of chloroform and ice water. The mixture is neutralized with sodium bicarbonate, the chloroform separated, washed with water and evaporated to dryness in vacuo. The residue is chromatographed on Woelm neutral alumina. Elution with 10% chloroform in benzene yields first 9α-fluoro-Δ⁴,¹⁶-pregnadiene-12β,21-diol-3,20-dione 21 acetate, which on crystallization from acetone-hexane yields a pure product which melts at about 215–217°; $[\alpha]_D^{22}$ +112° (chlf.);

$\lambda_{max.}^{alc.}$ 238 m$\mu$ ($\epsilon$ = 28,500); $\lambda_{max.}^{Nujol}$ 2.92, 5.71, 6.02, 6.19, 6.30$\mu$

*Analysis.*—Calcd. for $C_{23}H_{29}O_5F$ (404.46): C, 68.29; H, 7.22. Found: C, 68.42; H, 7.03, and subsequently 12α-fluoro-Δ⁴,¹⁶-pregnadiene-11β,21-diol-3,20-dione 21-acetate.

EXAMPLE 2

*9α-Fluoro-Δ¹,⁴,¹⁶-Pregnatriene-12β,21-Diol-3,20-Dione 21-Acetate*

To a solution of 1.0 g. of 9α-fluoro-Δ⁴,¹⁶-pregnadiene-12β,21-diol-3,20-dione 21-acetate in 50 ml. of purified dioxane 700 mg. of 2,3-dichloro-5,6-dicyanobenzoquinone are added and the resulting solution refluxed under nitrogen for six hours. After cooling the precipitated 2,3-dichloro-5,6-dicyanohydroquinone is filtered and washed with dioxane. The combined filtrate and washings are diluted with an equal volume of chloroform and adsorbed onto 40 g. of Woelm neutral alumina. Elution with chloroform and crystallization of the residue of the eluates from acetone-hexane gives 9α-fluoro-Δ¹,⁴,¹⁶-pregnatriene-12β,21-diol-3,20-dione 21-acetate.

EXAMPLE 3

*9α-Fluoro-Δ⁴,¹⁶-Pregnadiene-12β,21-Diol-3,20-Dione*

To a solution of 25 mg. of 9α-fluoro-Δ⁴,¹⁶-pregnadiene-12β,21-diol-3,20-dione 21-acetate in 5 ml. of methanol (oxygen free) is added 0.5 ml. of 10% aqueous potassium carbonate and the solution left under nitrogen for 2 hours. The solution is then neutralized with acetic acid diluted with 3 ml. of water and evaporated in vacuo whereupon the 9α-fluoro-Δ⁴,¹⁶-pregnadiene-12β,21-diol-3,20-dione crystallizes and is filtered, washed with water and dried.

EXAMPLE 4

*9α-Fluoro-Δ¹,⁴,¹⁶-Pregnatriene-12β,21-Diol-3,20-Dione*

Following the procedure of Example 3 but substituting 9α-fluoro-Δ¹,⁴,¹⁶-pregnatriene-11β,21-diol - 3,20 - dione 21-acetate for 9α-fluoro-Δ⁴,¹⁶-pregnadiene-12β,21-diol-3,20-dione 21-acetate there is obtained 9α-fluoro-Δ¹,⁴,¹⁶-pregnatriene-12β,21-diol-3,20-dione.

EXAMPLE 5

*9α-Fluoro-Δ⁴-Pregnene-12β,16α,17α,21-Tetrol-3,20-Dione 21-Acetate*

To a stirred solution of 101 mg. (0.25 mmol) of 9α-fluoro-Δ⁴,¹⁶-pregnadiene-12β,21-diol-3,20-dione 21-acetate in 10 ml. of benzene containing 0.3 ml. of pyridine, a solution of 64.5 mg. (0.25 mmol) of osmium tetroxide in 1 ml. of benzene is added dropwise over a 10 minute period. The solution is stirred at room temperature for 20 hours and then 10 ml. of an oxygen-free solution containing 800 mg. each of sodium sulfite and potassium bicarbonate is added followed by 5 ml. of oxygen-free methanol. The mixture is stirred under nitrogen for 5 hours, then filtered, and washed well with chloroform and tetrahydrofuran. The filtrate is washed with water and evaporated to dryness, in vacuo. Crystallization of the residue from acetone-hexane gives about 30 mg. of 9α-fluoro-Δ⁴-pregnene-12β,16α,17α,21-tetrol-3,20-dione 21-acetate having M.P. about 225–226°;

$\lambda_{max.}^{alc.}$ 237 mμ (ε=18,300); $\lambda_{max.}^{Nujol}$ 2.94–2.98, 5.87, 5.94, 6.17μ

*Analysis.*—Calcd. for C₂₃H₃₁O₇F (438.48): C, 62.99; H, 7.13. Found: C, 62.80; H, 7.47.

EXAMPLE 6

9α-Fluoro-Δ¹,⁴-Pregnadiene-12β,16α,17α,21-Tetrol-3,20-Dione 21-Acetate

Following the procedure of Example 5 but substituting an equivalent amount of 9α-fluoro-Δ¹,⁴,¹⁶-pregnatriene-12β-21-diol-3,20-dione 21-acetate for the 9α-fluoro-Δ⁴,¹⁶-pregnadiene-12β,21-diol-3,20-dione 21-acetate, 9α-fluoro-Δ¹,⁴-pregnadiene-12β,16α,17α,21-tetrol-3,20-dione 21-acetate is obtained.

Similarly, 9α-fluoro-Δ⁴,¹⁶-pregnadiene-12β,21-diol-3,20-dione and 9α-fluoro-Δ¹,⁴,¹⁶-pregnatriene-12β,21-diol-3,20-dione yield 9α-fluoro-Δ⁴-pregnadiene-12β,16α,17α,21-tetrol-3,20-dione and 9α-fluoro-Δ¹,⁴-pregnadiene-12β,16α,17α,21-tetrol-3,20-dione, respectively.

EXAMPLE 7

9α-Fluoro-Δ⁴-Pregnene-12β,16α,17α,21-Tetrol-3,20-Dione 16,17-Acetonide 21-Acetate A solution of 30.7 mg. of 9α-fluoro-Δ⁴-pregnene-12β,16α,17α,21-tetrol-3,20-dione 21-acetate in 10 ml. of acetone containing 0.01 ml. of perchloric acid is left at room temperature for 2 hours. It is then neutralized with 5% NaHCO₃ and diluted with 10 ml. of water. Slow evaporation of the acetone in vacuo yields the crystalline 9α-fluoro-Δ⁴-pregnene-12β,16α,17α,21-tetrol-3,20-dione 16,17-acetonide 21-acetate which is filtered, washed with water and dried. M.P. about 278–280°; $[\alpha]_D^{22}+78°$ (chlf.);

$\lambda_{max.}^{alc.}$ 237 mμ (ε=19,500); $\lambda_{max.}^{Nujol}$ 2.80, 5.70, 5.79, 5.96, 6.14μ

*Analysis.*—Calcd. for C₁₆H₃₅O₇F (478.54): C, 65.26; H, 7.37; F, 4.05. Found: C, 65.88; H, 7.16; F, 4.00.

EXAMPLE 8

9α-Fluoro-Δ⁴-Pregnene-12β,16α,17α,21-Tetrol-3,20-Dione 16,17-Acetophenonide 21-Acetate Following the procedure of Example 7 but substituting an equivalent amount of acetophenone for the acetone, 9α-fluoro-Δ⁴-pregnene-12β,16α,17α,21-tetrol-3,20-dione 16,17-acetophenonide 21-acetate is obtained.

Similarly, substitution of any of the other aldehydes or ketones listed hereinbefore for the acetone in the procedure of Example 7 results in the preparation of the corresponding 16,17-acetal or ketal derivatives.

EXAMPLE 9

9α-Fluoro-Δ¹,⁴-Pregnadiene-12β,16α,17α,21-Tetrol-3,20-Dione 16,17-Acetonide 21-Acetate Following the procedure of Example 7 but substituting an equivalent amount of 9α-fluoro-Δ¹,⁴-pregnadiene-12β,16α-17α,21-tetrol-3,20-dione 21-acetate for the 9α-fluoro-Δ⁴-pregnene-12β,16α,17α,21-tetrol-3,20-dione 21-acetate, 9α-fluoro-Δ¹,⁴-pregnadiene-12β,16α,17α,21-tetrol - 3,20-dione 16,17-acetonide 21-acetate is obtained.

Similarly, 9α-fluoro-Δ⁴-pregnene-12β,16α,17α,21-tetrol-3,20-dione and 9α-fluoro-Δ¹,⁴-pregnadiene-12β,16α,17α,21-tetrol-3,20-dione yield their respective 16,17-acetonides when treated by the process of Example 7.

EXAMPLE 10

11β,12β-Oxido-Δ⁴-Pregnene-16α,17α,21-Triol-3,20-Dione 21-Acetate

Ninety-eight milligrams of 11β,12β-oxido-Δ⁴,¹⁶-pregnadiene-21-ol-3,20-dione 21-acetate is treated with 69 mg. of osmium tetroxide as described in Example 5 and gives on crystallization from acetone-hexane about 35 mg. of 11β,12β-oxido-Δ⁴-pregnene-16α,17α,21-triol-3,20-dione 21-acetate having M.P. about 228–230°; $[\alpha]_D^{22}$ +166° (chlf.);

$\lambda_{max.}^{alc.}$ 239 mμ (ε=17,500); $\lambda_{max.}^{Nujol}$ 2.85, 2.94, 5.72, 5.81, 6.07, 6.21μ

*Analysis.*—Calcd. for C₂₃H₃₀O₇ (418.47): C, 66.00; H, 7.22. Found: C, 66.58; H, 7.54.

EXAMPLE 11

11β,12β - Oxido - Δ¹,⁴ - Pregnadiene - 16α,17α,21 - Triol-3,20-Dione 21-Acetate Following the procedure of Example 2 but substituting an equivalent amount of 11β,12β-oxido-Δ⁴-pregnene-16α,-17α,21-triol-3,20-dione 21-acetate for the 9α-fluoro-Δ⁴,¹⁶-pregnadiene-12β,21-diol-3,20-dione 21-acetate, 11β,12β-oxido-Δ¹,⁴-pregnadiene-16α,17α,21-triol-3,20-dione 21-acetate is obtained.

EXAMPLE 12

11β,12β - Oxido - Δ⁴ - Pregnene - 16α,17α,21 - Triol - 3,20-Dione

Following the procedure of Example 3 but substituting an equivalent amount of 11β,12β-oxido-Δ⁴-pregnene-16α,-17α-21-triol-3,20-dione 21-acetate for the 9α-fluoro-Δ⁴,¹⁶-pregnadiene-12β,21-diol-3,20-dione 21-acetate, 11β,12β-oxido-Δ⁴-pregnene-16α,17α,21-triol-3,20-dione is obtained.

EXAMPLE 13

11β,12β - Oxido - Δ¹,⁴ - Pregnadiene - 16α,17α,21 - Triol-3,20-Dione

Following the procedure of Example 3 but substituting an equivalent amount of 11β,12β-oxido-Δ¹,⁴-pregnadiene-16α,17α,21-triol-3,20-dione 21-acetate for the 9α-fluoro-Δ⁴,¹⁶-pregnadiene-12β,21-diol-3,20-dione 21-acetate, 11β,-12β - oxido - Δ¹,⁴ - pregnadiene - 16α,17α,21 - triol - 3,20-dione is obtained.

EXAMPLE 14

11β,12β - Oxido - Δ⁴ - Pregnene - 16α,17α,21 -Triol - 3,20-Dione 16,17-Acetonide 21-Acetate Twenty-one milligrams of 11β,12β-oxido-Δ⁴-pregnene-16α,17α,21-triol-3,20-dione 21-acetate is treated with 5 ml. of acetone containing 0.005 ml. of perchloric acid as described in Example 7 and gives about 18.4 mg. of 11β,-12β-oxido-Δ⁴-pregnene-16α,17α,21-triol-3,20-dione 16,17-acetonide 21-acetate having M.P. about 240–242°; $[\alpha]_D^{22}+175°$ chlf.);

$\lambda_{max.}^{alc.}$ 239 mμ (ε=17,500); $\lambda_{max.}^{Nujol}$ 5.70, 5.78, 5.99, 6.19μ

*Analysis.*—Calcd. for C₂₆H₃₄O₇ (458.53): C, 68.10; H, 7.47. Found: C, 68.15; H, 7.51.

EXAMPLE 15

11β,12β - Oxido - Δ⁴ - Pregnene - 16α,17α,21 - Triol - 3,20-Dione 16,17-Acetophenonide 21-Acetate Following the procedure of Example 14 but substituting an equivalent amount of acetophenone for the acetone, 11β,12β-oxido-Δ⁴-pregnene-16α,17α,21-triol-3,20-dione 16,17-acetophenonide 21-acetate is obtained.

Similarly, substitution of any of the other aldehydes or ketones listed hereinbefore for the acetone in the procedure of Example 14 results in the preparation of the corresponding 16,17-acetal or ketal derivatives.

EXAMPLE 16

*11β,12β - Oxido-Δ¹,⁴ - Pregnadiene - 16α,17α,21 - Triol-3,20-Dione 16,17-Acetonide 21-Acetate*

Following the procedure of Example 14 but substituting an equivalent amount of 11β,12β-oxido-Δ¹,⁴-pregnadiene-16α,17α,21-triol-3,20-dione 21-acetate for the 11β,12β-oxido-Δ⁴-pregnene-16α,17α,21-triol-3,20-dione-21-acetate, 11β,12β-oxido-Δ¹,⁴-pregnadiene-16α,17α,21-triol-3,20-dione 16,17-acetonide 21-acetate is obtained.

Similarly, 11β,12β-oxido-Δ⁴-pregnene-16α,17α,21-triol-3,20-dione and 11β,12β-oxido-Δ¹,⁴-pregnadiene-16α,17α,-21-triol-3,20-dione yield their respective 16,17-acetonides when treated by the process of Example 14.

EXAMPLE 17

*9α - Fluoro - Δ⁴ - Pregnene - 12β,16α,17α,21 - Tetrol-3,20-Dione 16,17-Acetonide 21-Acetate*

A solution of 15 mg. of 11β,12β-oxido-Δ⁴-pregnene-16α,17α,21-triol-3,20-dione 16,17-acetonide 21-acetate in 5 ml. of chloroform and 1.2 ml. of tetrahydrofuran contained in a polyethylene bottle is cooled in an acetone-Dry Ice bath and 1.0 ml. of hydrogen fluoride is added. The bottle is stoppered and left at 0° for 6 hours and then poured into a mixture of 50 ml. each of ice water and chloroform contained in a polyethylene beaker. The mixture is neutralized with sodium bicarbonate, the chloroform separated, washed with water and evaporated to dryness. Chromatography of the residue on alumina gives on crystallization from acetone-hexane 9α-fluoro-Δ⁴-pregnene-12β,16α,17α,21-tetrol-3,20-dione 16,17-acetonide 21-acetate.

EXAMPLE 18

*9α - Fluoro - Δ¹,⁴ - Pregnadiene - 12β,16α,17α,21 - Tetrol-3,20-Dione 16,17-Acetonide 21-Acetate*

Following the procedure of Example 17 but substituting an equivalent amount of 11β,12β-oxido-Δ¹,⁴-pregnadiene-16α,17α,21-triol-3,20-dione 16,17-acetonide 21-acetate for the 11β,12β-oxido-Δ⁴-pregnene-16α,17α,21-triol-3,20-dione 16,17-acetonide 21-acetate, 9α-fluoro-Δ¹,⁴-pregnadiene-12β,16α,17α,21-tetrol-3,20-dione 16,17-acetonide 21-acetate is obtained.

Similarly, 11β,12β-oxido-Δ⁴-pregnene-16α,17α,21-triol-3,20-dione 16,17-acetophenonide 21-acetate, 11β,12β-oxido-Δ⁴-pregnene-16α,17α,21-triol-3,20-dione 16,17-acetonide and 11β,12β-oxido-Δ¹,⁴-pregnadiene-16α,17α,21-triol-3,20-dione 16,17-acetonide yield 9α-fluoro-Δ⁴-pregnene-12β,16α,17α,21-tetrol-3,20-dione 16,17-acetophenonide 21-acetate, 9α-fluoro-Δ⁴-pregnene-12β,16α,17α,21-tetrol-3,20-dione 16,17-acetonide and 9α-fluoro-Δ¹,⁴-pregnadiene 12β,16α,17α,21-tetrol-3,20-dione 16,17-acetonide, respectively.

EXAMPLE 19

*9α - Fluoro - Δ⁴ - Pregnene - 16α,17α,21 - Triol -3,12,20-Trione 16,17-Acetonide 21-Acetate*

A solution of 6.3 mg. of 9α-fluoro-Δ⁴-pregnene-12β,16α,17α,21-tetrol-3,20-dione 16,17-acetonide 21-acetate in 1 ml. of reagent grade acetone is treated with 0.03 ml. of a solution of chromic anhydride and sulfuric acid in water (Jones reagent). After 10 minutes the excess oxidizing agent is decomposed with methanol and the mixture diluted with water and extracted with chloroform. The chloroform is washed with water and evaporated to dryness, in vacuo. Crystallization of the residue from acetone-hexane gives 9α-fluoro-Δ⁴-pregnene-16α,17α,21-triol-3,12,20-trione 16,17-acetonide 21-acetate having M.P. about 219–220°.;

$\lambda_{max.}^{alc.}$ 235 mμ (ε=18,000); $\lambda_{max.}^{Nujol}$ 5.70, 5.78, 6.00, 6.15μ

EXAMPLE 20

*9α - Fluoro - Δ¹,⁴ - Pregnadiene - 16α,17α,21 - Triol - 3-12,20-Trione 16,17-Acetonide 21-Acetate*

Following the procedure of Example 19 but substituting an equivalent amount of 9α-fluoro-Δ¹,⁴-pregnadiene-12β,16α,17α,21-tetrol-3,20-dione 16,17-acetonide 21-acetate for the 9α-fluoro-Δ⁴-pregnene-12β,16α,17α,21-tetrol-3,20-dione 16,17-acetonide 21-acetate, 9α-fluoro-Δ¹,⁴-pregnadiene-16α,17α,21-triol-3,12,20-trione 16,17-acetonide 21-acetate is obtained.

Similarly, 9α-fluoro-Δ⁴-pregnene-12β,16α,17α,21-tetrol-3,20-dione 16,17-acetophenonide 21-acetate, 9α-fluoro-Δ⁴-pregnene-12β,16α,17α,21-tetrol-3,20-dione 16,17-acetonide and 9α-fluoro-Δ¹,⁴-pregnadiene-12β,16α,17α,21-tetrol-3,20-dione 16,17-acetonide yield 9α-fluoro-Δ⁴-pregnene-16α,17α,21-triol-3,12,20-trione 16,17-acetophenonide 21-acetate, 9α-fluoro-Δ⁴-pregnene - 16α,17α,21 - triol-3,12,20-trione 16,17-acetonide, and 9α-fluoro-Δ¹,⁴-pregnadiene-16α,17α,21-triol 3,12,20-trione 16,17-acetonide, respectively.

EXAMPLE 21

*Δ⁴,⁹⁽¹¹⁾-Pregnadiene-16α,17α,21-triol-3,12,20-Trione 16,17-Acetonide 21-Acetate*

To a solution of 9α-fluoro-Δ⁴-pregnene-16α,17α,21-triol-3,12,20-trione 16,17-acetonide 21-acetate in tetrahydrofuran a dilute solution of sodium hydroxide is added. After 30 minutes at room temperature under nitrogen the solution is neutralized, diluted with water and extracted with chloroform. Evaporation of the chloroform and acetylation of the residue with acetic anhydride and pyridine gives Δ⁴,⁹⁽¹¹⁾-pregnadiene-16α,17α,21-triol-3,12,20-trione 16,17-acetonide 21-acetate.

EXAMPLE 22

*Δ⁴,⁹⁽¹¹⁾-Pregnadiene-16α,17α,21-Triol-3,12,20-Trione 16,17-Acetophenonide*

Following the procedure of Example 21 but substituting an equivalent amount of 9α-fluoro-Δ⁴-pregnene-16α,17α,21-triol-3,12,20-trione 16,17-acetophenonide 21-acetate for the acetonide, Δ⁴,⁹⁽¹¹⁾-pregnadiene-16α,17α,21-triol-3,12,20-trione 16,17-acetophenonide is obtained.

EXAMPLE 23

*Δ¹,⁴,⁹⁽¹¹⁾-Pregnatriene-16α,17α,21-Triol-3,12,20-Trione 16,17-Acetonide*

Following the procedure of Example 21 but substituting an equivalent amount of 9α-fluoro-Δ¹,⁴-pregnadiene-16α,17α,21-triol-3,12,20-trione 16,17-acetonide 21-acetate for the acetonide, Δ¹,⁴,⁹⁽¹¹⁾-pregnatriene-16α,17α,21-triol-3,12,20-trione 16,17-acetonide is obtained.

The invention may be variously otherwise embodied within the scope of the appended claims.

What is claimed is:

1. A compound selected from the group consisting of steroids of the general formula

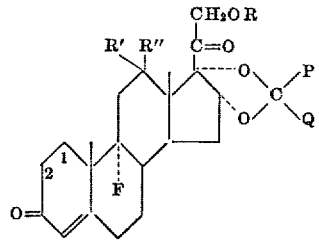

and the 1,2-dehydro derivatives thereof, wherein R' is hydrogen, R" is β-hydroxy and together R' and R" is keto; R is selected from the group consisting of hydrogen and the acyl radical of a hydrocarbon carboxylic acid of less than ten carbon atoms; P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon to which they are joined P and Q is selected from the group consisting of cycloalkyl and monocyclic heterocyclic.

2. 9α-fluoro-Δ⁴-pregnene - 12β,16α,17α,21 - tetrol-3,20-dione 16,17-acetonide 21-acetate.

3. 9α-fluoro - Δ⁴ - pregnene - 16α,17α,21 - triol-3,12,20-trione 16,17-acetonide 21-acetate.

4. A compound selected from the group consisting of 9α-fluoro-Δ⁴,¹⁶-pregnadiene - 12β,21 - diol-3,20-dione, 9α-fluoro-Δ¹,⁴,¹⁶-pregnatriene-12β,21-diol-3,20-dione, and the 21-esters of either with a hydrocarbon carboxylic acid of less than ten carbon atoms.

5. 9α-fluoro-Δ⁴,¹⁶-pregnadiene - 12β,21 - diol-3,20-dione 21-acetate.

6. A compound selected from the group consisting of 9α-fluoro-Δ⁴-pregnene - 12β,16α,17α,21 - tetrol-3,20-dione, 9α - fluoro-Δ¹,⁴-pregnadiene - 12β,16α,17α,21 - tetrol-3,20-dione, and the 21-esters of either with a hydrocarbon carboxylic acid of less than ten carbon atoms.

7. 9α-fluoro - Δ⁴ - pregnene-12β,16α,17α,21-tetrol-3,20-dione 21-acetate.

8. A compound selected from the group consisting of 11β,12β-oxido-Δ⁴-pregnene - 16α,17α,21 - triol-3,20-dione, 11β,12β-oxido-Δ¹,⁴-pregnadiene - 16α,17α,21 - triol-3,20-dione, and the 21-esters of either with a hydrocarbon carboxylic acid of less than ten carbon atoms.

9. 11β,12β-oxido-Δ⁴-pregnene-16α,17α,21-triol-3,20-dione 21-acetate.

10. A compound selected from the group consisting of steroids of the general formula

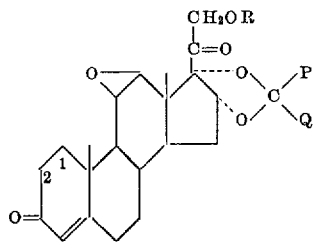

and the 1,2-dehydro derivatives thereof, wherein R is selected from the group consisting of hydrogen and the acyl radical of a hydrocarbon carboxylic acid of less than ten carbon atoms; P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic hetero-cyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon to which they are joined P and Q is selected from the group consisting of cycloalkyl and monocyclic heterocyclic.

11. 11β,12β-oxido-Δ⁴-pregnene-16α,17α,21-triol-3,20-dione 16,17-acetonide 21-acetate.

12. A compound selected from the group consisting of steroids of the general formula

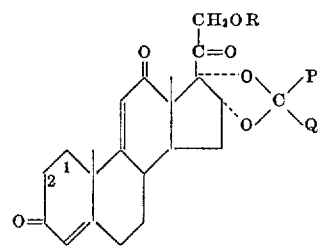

and the 1,2-dehydro derivatives thereof, wherein R is selected from the group consisting of hydrogen and the acyl radical of a hydrocarbon carboxylic acid of less than ten carbon atoms; P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon to which they are joined P and Q is selected from the group consisting of cycloalkyl and monocyclic heterocyclic.

13. Δ⁴,⁹⁽¹¹⁾-Pregnadiene-16α,17α,21-triol-3,12,20-trione 16,17-acetonide.

References Cited in the file of this patent
UNITED STATES PATENTS 3,000,911    Fried et al _____ Sept. 19, 1961

OTHER REFERENCES

Bernstein et al.: J.A.C.S., vol. 82, 1960, pp. 1235–1239, QD 1A5 C.3.

Fox et al.: J.A.C.S., vol. 82, 1960, pp. 2580–2585, QD 1A5 C.3.

UNITED STATES PATENT OFFICE
CERTIFICATE OF CORRECTION

Patent No. 3,093,637                  June 11, 1963

Patrick A. Diassi

It is hereby certified that error appears in the above numbered patent requiring correction and that the said Letters Patent should read as corrected below.

Column 1, formula D should appear as shown below instead of as in the patent:

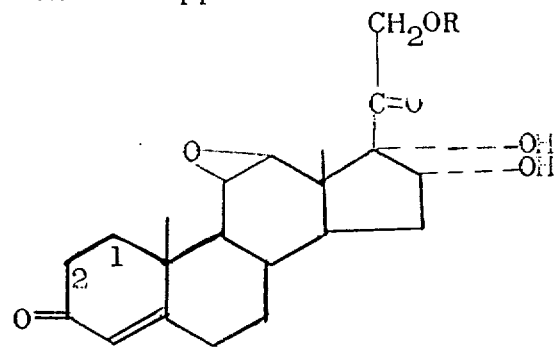

Same column formula E should appear as shown below instead of as in the patent:

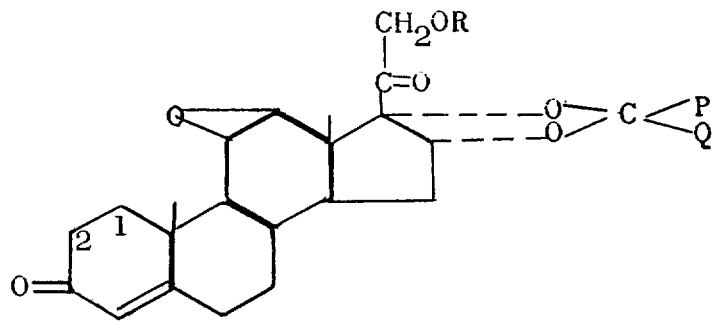

Same column 1, formula G should appear as shown below instead of as in the patent:

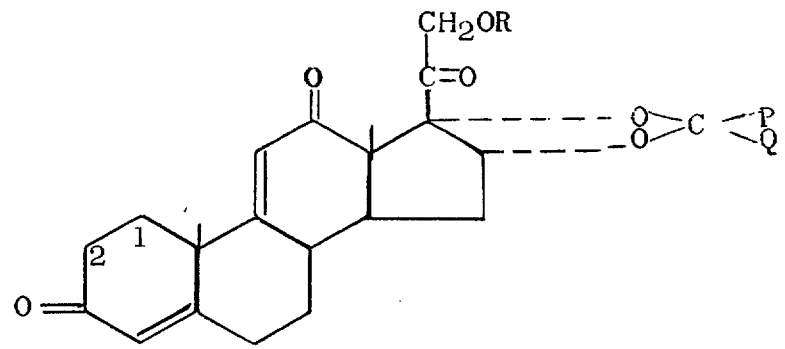

Column 2, line 31, for "-12α" read -- -12β --; lines 65 and 66, for "neutraizizing" read -- neutralizing --; column 7, line 47, for "C₁₆H₃₅O₇F" read -- $C_{26}H_{35}O_7F$ --.

Signed and sealed this 14th day of January 1964.

SEAL)
Attest:

ERNEST W. SWIDER

Attesting Officer

EDWIN L. REYNOLDS
Acting Commissioner
of Patents